United States Patent [19]

Klufas

[11] Patent Number: 4,477,227

[45] Date of Patent: Oct. 16, 1984

[54] KEYING FOR SHRUNK-ON TURBINE WHEELS

[75] Inventor: Oleg Klufas, Schenectady, N.Y.

[73] Assignee: General Electric Company, Schenectady, N.Y.

[21] Appl. No.: 280,674

[22] Filed: Jul. 6, 1981

[51] Int. Cl.³ ............................................. F01D 5/30
[52] U.S. Cl. ............................ 416/198 A; 416/201 R; 416/244 A
[58] Field of Search .......... 416/198 A, 200 A, 201 R, 416/244 A

[56] References Cited

U.S. PATENT DOCUMENTS

| | | | |
|---|---|---|---|
| 740,945 | 10/1903 | Taplin | 416/198 A |
| 917,206 | 4/1909 | Watts | 416/200 |
| 1,107,238 | 8/1914 | Kieser | 416/198 A |
| 2,660,399 | 11/1953 | Robinson et al. | 416/198 A |
| 2,769,611 | 11/1956 | Schwarzkopf | 416/198 A |
| 4,029,437 | 6/1977 | Aubrey | 416/244 A |
| 4,123,199 | 10/1978 | Shimizu | 416/198 A |

FOREIGN PATENT DOCUMENTS 2402218  1/1974  Fed. Rep. of Germany ... 416/198 A

OTHER PUBLICATIONS

Hodge et al., *The Institution of Mechanical Engineers*, Proceedings 1979, vol. 193, No. 11.

*Primary Examiner*—Philip R. Coe
*Assistant Examiner*—Michael Knick
*Attorney, Agent, or Firm*—Paul Checkovich; John F. Ahern

[57] ABSTRACT

A turbine rotor structure is disclosed in which shrink-fitted turbine wheels are keyed to the turbine shaft to prevent rotation of the wheels with respect to the shaft in the event of any loosening of the shrink fit. In a preferred arrangement, the rotatable shaft of the turbine is provided with an integral flange, near one end, having two diametrically opposed, notched keyways formed at peripheral locations thereon. Each wheel of the set of wheels used to carry the turbine buckets includes an integral, central hub which extends axially to both sides of the wheel. Further, each hub has pairs of complementary keys and keyways whose members are axially opposite each other at peripheral locations on the wheel hubs. Thus, the key of the first wheel on the shaft mates with the keyway of the integral flange of the shaft and subsequently added wheels mate with each other. The high levels of mechanical stress found with previously used keying means located at the wheel bore are avoided and potential problems of steam condensation leading to water erosion and stress corrosion cracking in the keying means are eliminated.

6 Claims, 4 Drawing Figures

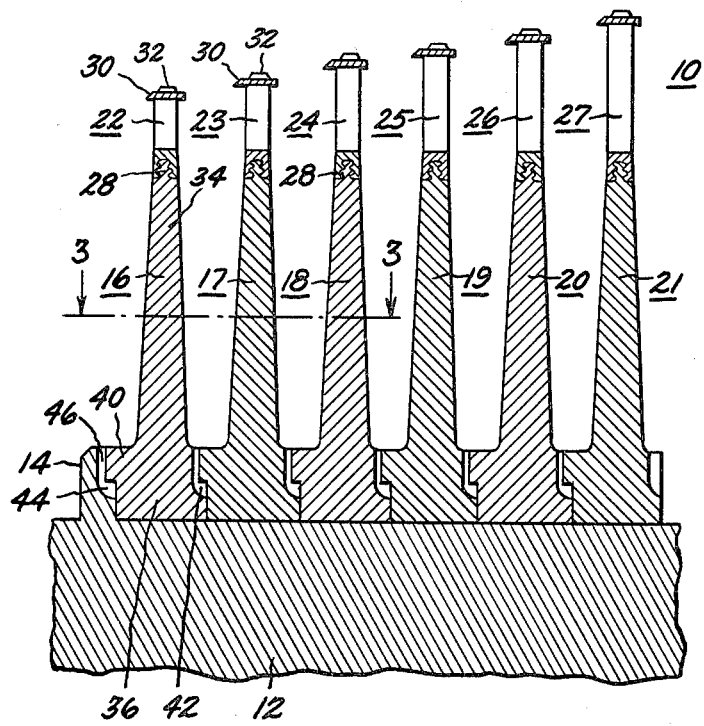
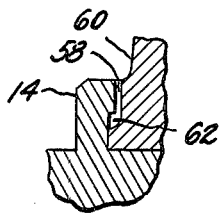
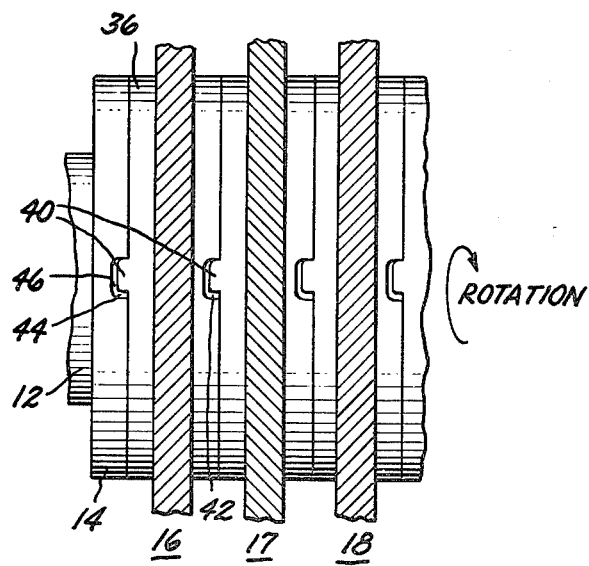
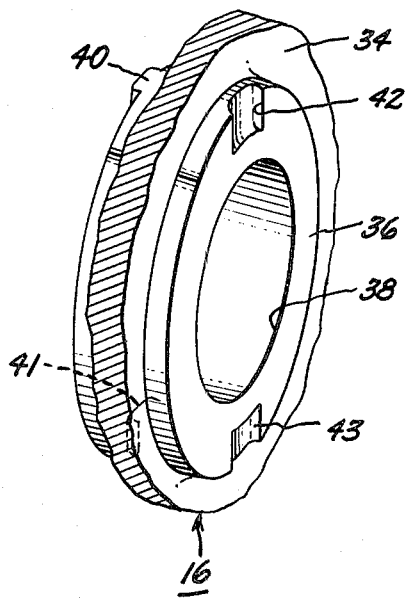

KEYING FOR SHRUNK-ON TURBINE WHEELS

BACKGROUND OF THE INVENTION

The present invention pertains to methods and apparatus for attaching the blade carrying wheels of a steam turbine to the turbine shaft.

For large steam turbines, it has not been entirely practical, at least for certain sections of the turbine, to fabricate the rotatable shaft and the wheels which carry the buckets, or blades, from an integral forging. For example, turbines deriving their power from nuclear energy sources often include low pressure sections which have wheel diameters on the order of six feet or more. Although a very limited number of forgings of this size, which permit the wheels to be machined integrally with the shaft, have been made, they are not readily available and larger diameter integral shaft and wheel combinations have not been demonstrated in commercial use.

What has generally been done instead, is to fabricate the wheels and shaft separately and then to shrink fit the wheels into position on the shaft. This has provided an acceptable manufacturing process. However, to further insure that the shrink fitted wheels do not, under any circumstances, rotate with respect to the shaft, antirotation keying means have been provided, in addition to the shrink fit, to further lock the wheels to the shaft. The antirotation keying means have, however, raised a separate set of problems.

In general, the wheels are keyed to the shaft by providing corresponding grooves or slots in the wheel bore and in the shaft surface. A separate metal block, appropriately termed a key, is inserted in the space defined by aligning the corresponding grooves. This further locks the wheel and shaft together. Problems with this configuration have resulted from the necessity of forming the keying grooves in an area of very high mechanical stress. For a shrunk-on turbine wheel, mechanical stress is greatest at the bore since it is the bore about which all of the rotating mass of the wheel is distributed. The keying means previously used, and as described above, have been located at the wheel bores, putting them at this point of intense stress. Because of surface discontinuities, inherent in the shape of the key and keyway these keying means have the potential for concentrating the stress even further. The result, in some turbine wheels, has been stress corrosion cracking in the area of the keyways to the point of destroying a wheel and putting the turbine out of service.

A separate problem with previous keying means has resulted from the fact that the keyway grooves have run from one side of the wheel to the other across a considerable temperature gradient. This had led to steam condensation in the grooves, the formation of liquid water therein, and errosion of the keyways by cavitation related processes.

In consideration of the shortcomings of previously used keying means for turbine shrunk-on wheels, it is an object of the present invention to provide an improved keying means which is subjected to substantially lower levels of mechanical stress than previously used wheel keying means and which is exposed to a substantially uniform operating temperature to prevent steam condensation and water errosion within the keying means.

It is a further object of the invention to provide means for keying shrink fitted turbine wheels to a shaft which avoids keys and keyways at the wheel bore, particularly for certain wheels which operate at steam conditions under which erosion and stress corrosion cracking may occur.

Still further objects and advantages of the invention will be apparent from an understanding of the principles and operation of the invention which will be gained from the detailed description of a preferred form of the invention which follows herein.

SUMMARY OF THE INVENTION

These and other objects are attained in a preferred embodiment of the invention by providing the central, rotatable shaft of the turbine with an integral flange having at least one keyway formed at a peripheral location thereon. Further, each wheel of the plurality of wheels used to carry the turbine buckets, or blades, includes an integral, central hub which extends axially to both sides of the wheel and which defines at least one pair of complementary keying means comprising a key and keyway, axially opposite each other at peripheral locations on the wheel hubs. With these features, the key of the first wheel on the shaft mates with the keyway of the integral flange and subsequently added wheels mate with each other. Preferably, the keys and keyways are formed with curves surfaces to avoid stress concentration points and are mated together with clearance spaces sufficient to allow insertion of small inspection probes.

Advantageously, the keying means of the invention are not located in the area of the wheel bore and are not exposed, during turbine operation, to large temperature gradients.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

FIG. 1 is a partial sectional view, along the axial flow direction, of a turbine rotor structure according to the invention;

FIG. 2 is a perspective view of a portion of one of the wheels of the turbine rotor structure of FIGS. 1 and 3; and FIG. 3 is a view of the rotor structure taken along the line 3—3 of FIG. 1.

DETAILED DESCRIPTION OF THE INVENTION

Referring to the drawings in detail, FIG. 1 is of a rotor structure, generally designed as 10, for an axial flow elastic fluid powered turbine such as a large steam turbine. Since the rotor structure generally is of considerable length and is symmetrical about the longitudinal axis, FIG. 1 shows only a fragmentary view of the rotor structure. Accordingly, it will be understood that the lower half of the rotor structure (not illustrated) is substantially identical to the upper half and forms a continuation thereof.

The rotor structure 10 includes a shaft 12 having an integral circumferential shoulder, or flange, 14 near one end and a plurality of axially spaced apart wheels 16–21 which are affixed to the shaft 12 by shrink fitting. The flange radially extends from the shaft as illustrated in FIGS. 1 and 3. The shrink fitting operation is a conventional process and is generally carried out by heating the wheels 16–21 to allow expansion to enlarge the central bore through each wheel. With the wheels 16–21 then in position on the shaft 12, the wheels are allowed to contract and firmly grip the shaft 12.

Each wheel, 16–21, carries a corresponding annular row of buckets, or blades, 22–27 affixed to its outer periphery as is conventional. For example, mating dovetail connections 28 are provided to respectively secure the buckets 22–27 to the wheels 16–21. Further, at the radially outer end of each bucket row are circumferential shroud bands 30 joining the buckets of each row to minimize radial outflow of steam between buckets. The shroud bands 30 are held in place by peened tenons 32, integrally formed at the outer ends of the buckets.

Since each wheel 16–21 is substantially identical in construction it will be convenient to initially describe only one wheel while bearing in mind their substantial identity. For example, FIG. 2 illustrates wheel 16 detached from the shaft 12 and is shown to include, in addition to the radially outer portion 34 to which the buckets are attached, a radially inner, central hub portion 37 which extends axially from opposing sides of the wheel 16 and which defines a bore 38 for mounting on shaft 12. The hub portion 36 is generally cylindrical in shape and includes, on one end, at the periphery of the hub 36, a pair of extending keys 40 and 41 which are substantially diametrically opposite each other on one face end of the hub 36. On the other face end of the hub 36, axially opposite the keys 40 and 41, are notched keyways 42 and 43, respectively, which are substantially complementary in form to the keys 40 and 41. As illustrated in all the figures, the keys and keyways occupy discrete arcuate and radial extent along the circumference of the hub. It is apparent that the hub of one wheel is matingly engageable to the hub of each adjacent wheel when each wheel is installed and shrink fitted to shaft 12 as shown in FIG. 1. That is, the projecting keys on one end of the hub fit into the keyways on a neighboring wheel and the hub ends generally come within close proximity of each other.

Referring again to FIG. 1 in conjunction with FIG. 3, integral circumferential flange 14 is also formed with keyways (only upper keyway 44 is specifically shown) to receive the keys (such as key 40) of the first wheel 16 installed on the shaft 12. Thus, the initial wheel 16 on the shaft 12 keyed to integral flange 14 and each subsequently installed wheel 17 through 21 is keyed to the adjacent wheel or wheels. Thus, in the event of any loosening of the shrink fit between any of the wheels 16–21 and the shaft 12, the wheel is still prevented from rotating with respect to the shaft 12 since all wheels are restrained by the interlocking keys and keyways.

Among the advantages of such wheel keying, as compared with previous techniques, is the fact that the keying means is radially removed from the wheel bore (as illustrated in FIG. 1 & 2) to a position of considerably lower mechanical stress on the periphery of the hub. FIGS. 1 and 2 clearly illustrate that keying means begin at the periphery of the hub portion and the radial extent of the keying means do not exceed one-half of the radial extent of the hub portion. Furthermore, since each key and keyway is entirely on one side of the wheel, temperature gradients are substantially eliminated in the vicinity of these components and no problem arises due to steam condensation within the keyways. It may be pointed out that a temperature gradient arises normally from one side of a wheel to another because of a reduction in steam temperature as it produces work in passing through the buckets of a particular wheel and imparts rotary motion thereto.

Preferably, as shown in FIG. 3, the keyways, such as keyway 44 on integral shoulder 14, are formed with continuous curvature to avoid sharp corners to prevent stress concentration at such points. It is additionally preferable that a clearance space, such as space 46 between key 40 and keyway 44, be maintained within each keyway between a portion of the key and the keyway. This clearance space, which may be on the order of ¼ inch between mating parts, provides for the insertion and manipulation of inspection probes such as those using fiber optics. Thus, periodic inspection of the keying means is facilitated. It will be noted, however, that the leading side of each key with respect to the direction of rotor rotation (e.g., key 40) is in intimate contact with the corresponding side of the keyway. This, in effect, puts the key in the position to which it would be forced in the event of a loosening of the shrink fit between the shaft 12 and the wheel. The rotation direction is indicated in FIG. 3 by the arrowed line.

While there has been shown and described what is considered a preferred embodiment of the invention, it is understood that various other modifications may be made therein. For example, although the integral flange 14 and turbine wheels 16–21 have been shown with a certain arrangement of keys and keyways, it will be apparent that other arrangements may be utilized consistent with the inventive concept. Thus, it will be recognized, for example, that flange 14 may be provided with a key rather than a keyway as illustrated and that the mating wheel may be provided with a complementary keyway. In addition, although integral flange 14 is illustrated to be located near one end of the shaft 12, for a double, opposed flow turbine it will be clear that the flange 14 will be near the middle of the shaft 12. Further it will be recognized to combine both keys and keyways on one side of a wheel and to distribute the keying means at various discrete circumferential locations about the wheel hub. It is intended to claim all such modifications which fall within the true spirit and scope of the present invention.

The invention claimed is:

1. A rotor for an axial flow elastic fluid turbine, comprising:
   a shaft, centrally mounted for rotation within the turbine and having an integral circumferential flange, said flange having at least one notched keyway formed at only a discrete peripheral radial and substantially circumferential location thereon; and
   a plurality of axially spaced apart wheels, each wheel affixed to the shaft by shrink fitting for carrying turbine blading peripherally affixed to each said wheel, each said wheel including a radially outer disk portion to which said blading is affixed and a radially inner hub portion projecting axially from each side of said disk, said hub portion having at least one axially protruding key disposed at a peripheral and substantially circumferential location on said hub, said hub portion having at least one keyway axially notched into its periphery at a substantially circumferential location thereon, said key and keyway being axially oppositely disposed on opposing axial ends of said hub, said key and keyway forming a complementary formed keying means which occupies a discrete arcuate and radial extent along the circumference of said hub, the radial extent of said keying means beginning at the hub periphery and not exceeding one-half the radial extent of said hub portion, said complementary formed keying means providing for matingly keying each wheel to adjacent wheels and for keying an end one of said wheels to said flange to prevent rotation of said plurality of said wheels relative to said shaft in the event of loosening of the shrink fit.

2. The rotor of claims 1, wherein said integral circumferential flange is located near one end of said shaft.

3. The rotor of claims 1 wherein said notched keyways are formed with continuous surface curvature to minimize mechanical stress concentration at said keyways.

4. The rotor of claim 3 wherein said keys and said keyways matingly engage to define a clearance space between a portion of each mating key and keyway for insertion of inspection devices.

5. A rotor for an axial flow elastic fluid powered turbine, comprising:

a shaft centrally mounted for rotation within the turbine;

a flange integral with said shaft which radially extends therefrom and is circumferential thereto, said flange having a smoothly curved notched keyway on its periphery, said keyway being radially removed from said shaft;

a plurality of axially spaced apart wheels for carrying turbine blading peripherally affixed to each wheel, each wheel including radially outer disk portion to which said blading is affixed and a radially inner hub portion projecting axially from each side of said disk;

said hub of each wheel having a concentric bore therethrough effective to be shrunk fit with said wheel onto said shaft, said hub having a smoothly curved key axially protruding from its periphery, said key being radially removed from said bore by at least one-half the radial extent of the hub, and said hub having a smoothly curved keyway axially notched into its periphery, said last recited keyway being axially opposite said key on said periphery of said hub; and at least one wheel of said plurality of wheels having a key protruding from its hub which matingly engages said keyway in said flange, and all remaining wheels having keys and keyways on their hubs which matingly engage the respective key and keyways on adjacent hubs and corresponding wheels, said engagement effective to prevent rotation of said plurality of wheels relative to said shaft in the event of loosening of the shrink fit.

6. A rotor for an axial flow elastic fluid turbine, comprising:

a shaft, centrally mounted for rotation within the turbine and having an integral circumferential flange, said flange having at least one axially protruding key formed at only a discrete peripheral radial and substantially circumferential location thereon; and a plurality of axially spaced apart wheels, each wheel affixed to the shaft by shrink fitting for carrying turbine blading peripherally affixed to each said wheel, each said wheel including a radially outer disk portion to which said blading is affixed and a radially inner hub portion projecting axially from each side of said disk, said hub portion having at least one axially protruding key disposed at a peripheral and substantially circumferential location on said hub, said hub portion having at least one keyway axially notched into its periphery at a substantially circumferential location thereon, said key and keyway being axially oppositely disposed on opposing axial ends of said hub, said key and keyway forming a complementary formed keying means which occupies a discrete arcuate and radial extent along the circumference of said hub, the radial extent of said keying means beginning at the hub periphery and not exceeding one-half the radial extent of said hub portion, said complementary formed keying means providing for matingly keying each wheel to adjacent wheels and for keying on end one of said wheels to said flange to prevent rotation of said plurality of said wheels relative to said shaft in the event of loosening of the shrink fit.

* * * * *